May 9, 1961
P. D. MERRILL
2,983,477
PLUG VALVE SADDLE
Filed April 19, 1956
2 Sheets-Sheet 1
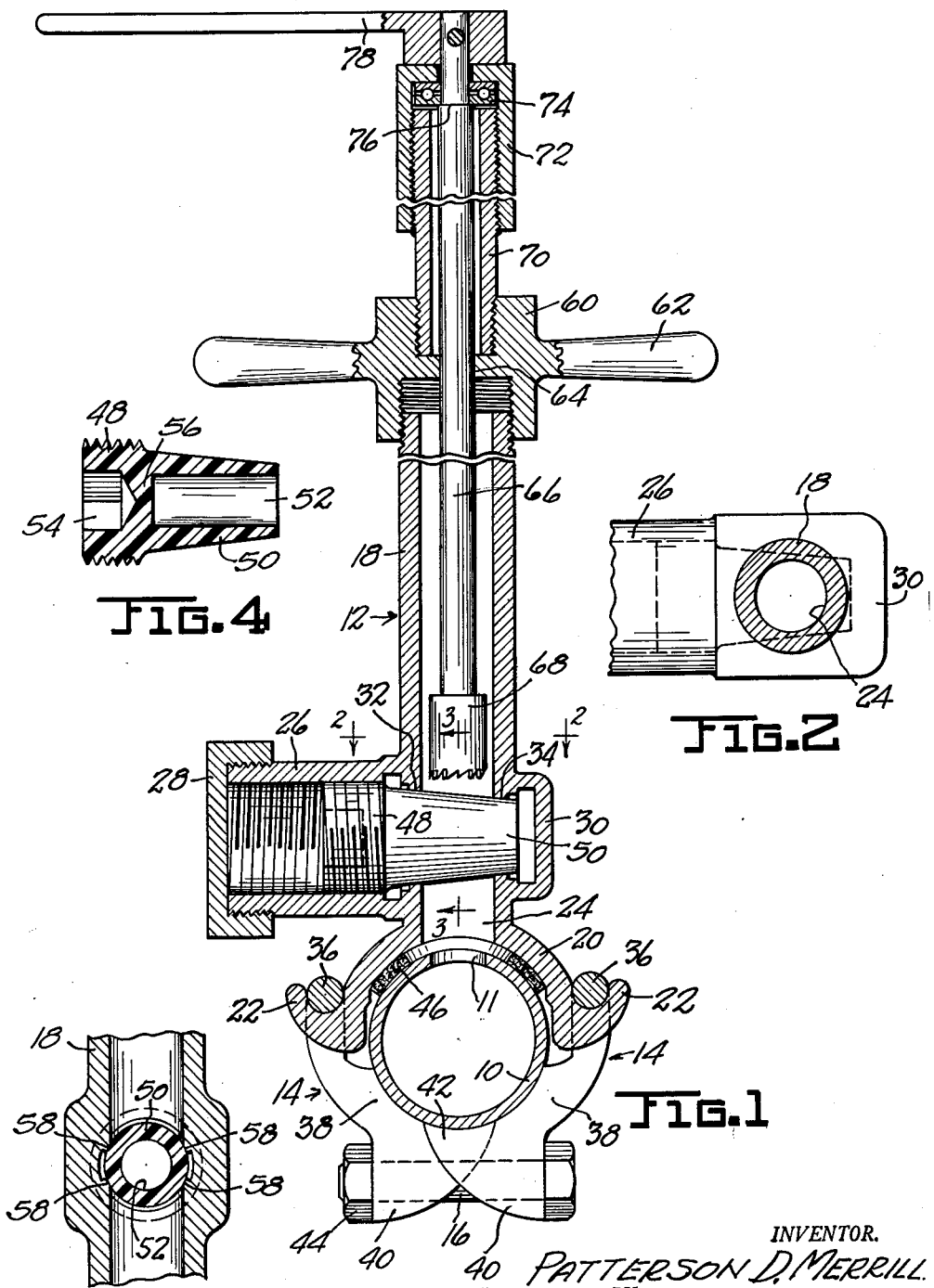
INVENTOR.
PATTERSON D. MERRILL
BY
Eugene C. Knoblock
ATTORNEY May 9, 1961
P. D. MERRILL
2,983,477
PLUG VALVE SADDLE
Filed April 19, 1956
2 Sheets-Sheet 2
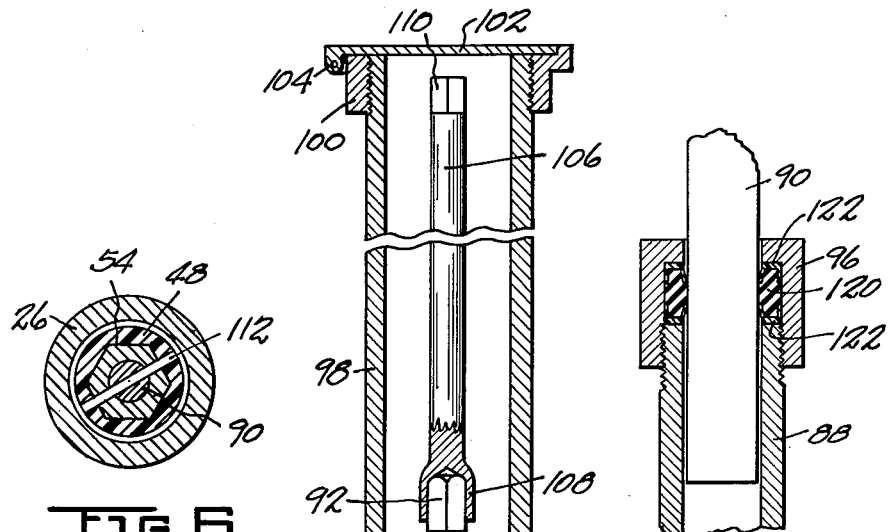
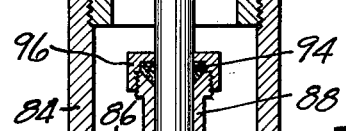
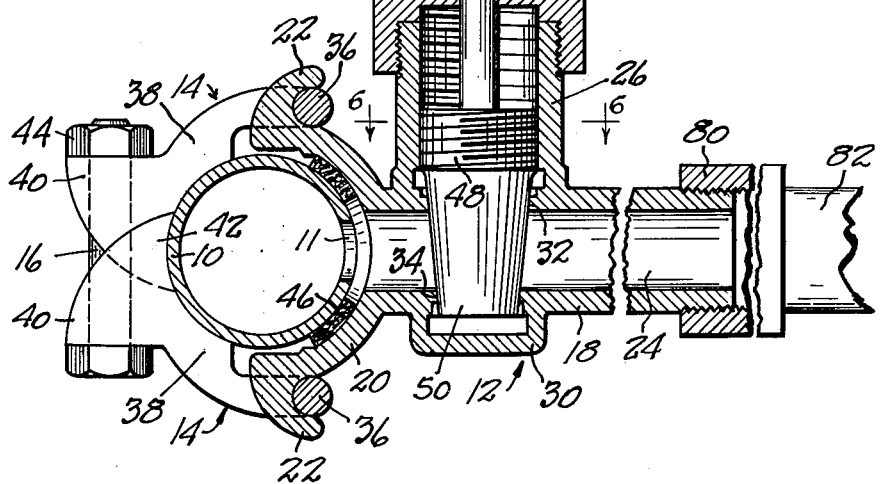
INVENTOR.
PATTERSON D. MERRILL
BY
Eugene C. Knoblock
ATTORNEY United States Patent Office 2,983,477
Patented May 9, 1961

2,983,477
PLUG VALVE SADDLE

Patterson D. Merrill, South Bend, Ind., assignor to M. B. Skinner Company, South Bend, Ind., a corporation of Indiana Filed Apr. 19, 1956, Ser. No. 579,377

4 Claims. (Cl. 251—146)

This invention relates to a plug valve saddle, and particularly to a device of this character adapted to be clamped to a pipe to accommodate drilling of that pipe, withdrawal of the drill, sealing of the fitting to accommodate removal of the drill and connection of a branch and then opening of the fitting.

The primary object of the invention is to provide a device of this character having a saddle plate and an integral tube with a bore extending from the saddle and through which a drilling operation may be performed upon a main to which a branch pipe may be connected, without danger of leakage of contents of the main incident to connection of the branch to the fitting.

A further object is to provide a device of this character having a novel tapered valve formed of a material which will yield incident to rotation so as to find its own seat and to adapt itself to irregularities of the valve seat, if such exist, and thereby insure positive and continuous sealing of the device.

A further object is to provide a valve formed of plastic material adapted to deform so as to squeeze into place in a receiving opening of slightly smaller cross sectional size than said valve, and yet avoid binding action as would occur in a similar fit between metal parts.

A further object is to provide a plastic valve plug having a tapered portion adapted to be urged against a valve seat and having a screw-threaded portion slightly oversize relative to a screw-threaded bore so that said valve is rendered fluid-tight both at its tapered portion when bearing against a seat and at its threaded portion.

Other objects will be apparent from the following specification.

In the drawing:

Fig. 1 is an axial section view of the device applied to a pipe and illustrating the drilling machine applied thereto;

Fig. 2 is a transverse sectional view taken on line 2—2 of Fig. 1;

Fig. 3 is a fragmentary axial sectional view taken on line 3—3 of Fig. 1;

Fig. 4 is an axial sectional view of a valve plug element;

Fig. 5 is an axial sectional view of the device having shut-off means adapted for selective operation;

Fig. 6 is a transverse sectional view taken on line 6—6 of Fig. 5; and

Fig. 7 is an enlarged detail sectional view of a modified embodiment of the invention.

Referring to the drawings, and particularly to Figs. 1 to 4, the numeral 10 designates a pipe to which my improved device is adapted to be connected. My improved device includes a body part 12 and clamp parts 14 urged into clamping relation with the pipe 10 by a draw bolt 16.

The body part 12 constitutes an elongated tube 18 preferably having a uniform bore throughout and an arcuate saddle 20 at one end thereof, the opposite ends of said saddle terminating in hook members 22.

The saddle 20 is preferably arranged symmetrically relative to the conduit 18 so that the bore 24 thereof opens substantially centrally of the saddle 20. A branch tube portion 26 is preferably formed integrally with the tube 18 and projects therefrom substantially at right angles thereto as illustrated in Fig. 1. The outer end of the tube 26 is preferably externally screw-threaded and the interior of the tube 26 is preferably screw-threaded throughout its full length and of a diameter greater than the diameter of bore 24 of tube 18. A cap 28 is adapted to be seated upon and secured to the outer end of the tube portion 26. In diametrically opposed relation to the tube 26 is formed integrally with the tube 18 an arch or dome portion 30. The tube 18 has a tapered aperture 32 formed therein concentrically of the tube portion 26 and establishing communication between the tube 24 and the interior of the tube 26. The tube 18 has a second tapered bore 34 coaxial with the bore 32 and with the tube 26 and diametrically opposed to the tapered opening 32. Tapered openings 32 and 34 are not only coaxial but also have their surfaces lying in a common conical outline. The walls of this tube 18 between openings 32 and 34 are also recessed at 58 as continuations of said tapered openings.

Each of the clamp members 14 has a loop or hook portion 36 detachably engaging with a hook 22 of the saddle 20, and has an intermediate body portion 38 adapted to bear against the exterior surface of the pipe 10. The opposite ends 40 of the clamp members 14 are apertured to receive the drawbolt 16 and preferably are flanged with the flanges offset so that the tips 42 may be positioned alongside each as illustrated in Fig. 1. A nut 44 upon the drawbolt 16 serves to draw clamp members 14 together and to pull the saddle member 20 toward the pipe 10. A gasket ring 46 will be interposed between the saddle 20 and the pipe 10 with its opening concentric with the bore 24. Tightening of the drawbolt 44 serves to compress the gasket 46 and to effect a seal between the saddle plate 20 and the pipe 10 around the bore 24.

A valve element is screw-threaded in the tube portion 26 and preferably constitutes a cylindrical end portion 48 screw-threaded within the tube 26 and preferably being of a diameter a few thousandths of an inch greater than the diameter of the bore so as to have a tight fit when forced into the bore of the tube portion 26. A frusto conical portion 50 projects from one end of the valve part 48. The valve part 48, 50 is preferably formed of plastic, such as polyethylene or a plastic in the nature of a polyamide resin made by the polymerization of a hexamethylenediamine salt of adipic acid, commonly known in the trade as nylon. The frusto conical portion 50 is preferably provided with a concentric recess 52 therein, and the cylindrical portion 48 of the valve has a configured tool-receiving concentric recess 54 at the opposite end thereof. The recesses 52 and 54 are separated by a web 56. The parts are so arranged that there will be minimum variations in wall thickness throughout the valve. The small diameter end of the tapered part 50 of the valve will be smaller than the valve seat 34, and the large diameter end of the tapered valve part will be larger than the diameter of the valve seat 32, and the taper of the part 50 of the valve will preferably be substantially the same as the taper of the valve seats 32 and 34. The overall length of the valve will be so related to the diameter of the bore 24 and the length of the tube 26 that the valve may be advanced to the position shown in Fig. 1 for the purpose of spanning and sealing the bore 24, in which case it will be seen that the portions of the bore 24 adjacent to the valve seats 32 and 34 will be slightly recessed as seen at 58 in Fig. 3, to insure that the tapered plug portion will be larger than the cross-section of the bore 24 and will completely span the same when it is advanced in the Fig. 1 position. The length of the tube portion 26 will be sufficient so that the valve may be withdrawn to the outer end thereof with the tip of its tapered portion 50 clear of the bore 24, for purposes to be described.

The free end of the tube 18 is preferably externally screw-threaded to receive and mount a drilling machine for the purpose of drilling a hole 11 in the pipe 10 in communication with the tube bore 24. As here shown the drilling machine constitutes an adapter 60 preferably having handles 62 and having a small bore 64 journalling an elongated shaft 66 which mounts a cutter 68 at its inner end. A tube 70 is carried by the adapter 60 and is externally screw-threaded at its upper end to mount an internally screw-threaded cup-shaped member 72. A bearing 74 fits within the cup-shaped member 72 and bears against a shoulder 76 on the shaft 66. An operating handle 78 is mounted upon the end of the shaft 66 which projects from the cup-shaped member 72.

While the device is shown in Fig. 1 with the tube 18 projecting vertically and upwardly from the pipe 10, in the usual arrangement of the parts the tube 18 will be positioned substantially horizontally or in laterally projecting relation to the pipe 10, and the tube portion 26 thereof will preferably project upwardly for ready access. In operation the fitting is first mounted upon the pipe 10 by means of the clamps 14 and the drawbolt 16 in such a manner as to effectively compress the gasket 46 and insure a seal between the pipe and the saddle around the bore 24. The valve plug 48, 50 will be withdrawn to the outer end of the tubular portion 26 so as to be clear of the bore 24. The drilling machine is then mounted upon the outer or free end of the tube 18 in the position shown, and may be operated in the manner well understood in the art by progressive advance of the cup member 72 upon the tube 70 and by rotation of the handle 78 for the purpose of drilling the opening 11 in the pipe. The pipe contents are sealed by the screw-threaded connection of the adapter 60 with the tube 18 and by the tight fit of the screw-threads of the valve part 48 in the tube portion 26.

After the drilling operation has been completed the drill stem 66, and drill head 68 are withdrawn to the position illustrated in Fig. 1 clear of the valve 48—50 seats 32 and 34, and thereupon the valve is screw-threaded from its retracted position to the position illustrated in Fig. 1. The fact that the valve is a plug valve and has a tapered portion fitting in a tapered seat provides important advantages in conjunction with its formation of plastic material. Nylon valve plugs possess great strength and yet will yield incident to rotation. These properties permit the portion 50 to find its own seat in the valve seats 32 and 34 and to adapt itself to any irregularities which may exist in the valve seat. Thus, in addition to the usual type of seating of tapered members in a tapered valve seat, there is a deforming fit and positive assurance of continuous seating of the plug. The same inherent resiliency of the nylon which accomplishes this type of seal, also makes it possible to oversize the portion 48 of the valve plug in the order of from .0002 to .0005 inch. The fact that the threaded portion 48 is slightly larger in diameter than the threaded bore which receives it gives a positive assurance of a complete seal between the plug part 48 and the tube 26, thus assuring a continuous and perfect fit thereof at the threads of the sleeve which will prevent leakage of fluid through the tube 26. It will, therefore, be apparent that the bore 24 is positively sealed by the valve so that the outer end of the tube 18 may be opened by the removal of the drilling machine. A branch connector (not shown) may then be connected to the free end of the tube 18, as by welding or by means of a coupling or connector. After this branch line has been connected the valve may be withdrawn into the tube 26 to open the tube 18 for passage of fluid from the pipe 10 to the branch line.

It will be apparent that the device provides a positively sealed condition at all times during the operation of effecting a connection between the main and a branch line. Thus, even in cases where the conduit 10 contains inflammable fluids and it is desired to weld a branch to the fitting 18, no danger of injury or damage can occur by reason of the sealed condition of the fitting. The device is simple and readily applied, and, once applied, remains effective at all times. It is possible, further, if it should ever be desired to remove the branch line, to do so by simply reclosing the plug valve 48. One of the important characteristics of the device resulting from the formation of a plug from nylon with the resilience and inherent seating, as mentioned above, is that cost of construction is reduced as compared to constructions in which metal plugs are employed. In metal plug valves it is necessary to lap the plug and the valve seat to each other, thus making it impossible to interchange plugs and valve seats and entailing substantial cost in the lapping operation. The present construction eliminates special fitting of a valve plug to a valve seat because of the yielding character of the valve and its self-seating and sealing characteristics. Thus the device is low in cost in addition to being highly efficient. In other words, the present device has an effective seal comparable to that produced by the closest and most expensive workmanship in all metal constructions, and yet there is no requirement for special care in the threading operation or in the forming of the valve seats 32 and 34.

It may be desired to use the device as a curb connection to a gas line to extend to a building at which gas service is to be supplied, and, in such connections, it may be desirable that a shutoff valve be incorporated adjacent to the main so that the service to the building may be discontinued at will and without requiring entry into the building. Such a use of the device is illustrated in Fig. 5, wherein a coupling 80 serves to connect a branch or other conduit 82 to the tubular portion 18 of the fitting which extends substantially horizontally from the main pipe 10. The tubular portion 26 of the fitting extends vertically and has mounted thereon an adapter in the nature of a tube 84 screw-threaded upon the tubular part 26 and spanned intermediate its ends by a cross-wall 86 from which projects a neck 88. The wall 86 and neck 88 define a bore to receive a shaft 90 having a configured end which seats in the socket 54 of the valve, and having a configured end 92 at its outer end. A packing gland is mounted upon the neck 88 to seal the joint between the shaft 90 and sleeve 88 and preferably constitutes packing material 94 received in a conical recess in the end of the sleeve 88 and pressed therein by a cup-shaped follower 96 screw-threaded on the end of the sleeve 88. A tube 98 is carried by the adapter 84 and preferably mounts a ring 100 at its upper end adjacent ground level to which is connected a closure plate 102, here shown as being pivotally connected to the ring 100 at 104. An extension shaft 106, having a socket portion 108 at one end fitting on the configured end 92 of the shaft 90, is positioned within the tube 106 and has a configured upper end 110 adapted to be engaged by a tool when the closure 102 is open. Thus it will be apparent that the valve 48, 50 may be operated at will to close the fitting and seal the branch 82 from the main 10. In this arrangement it may be desired to provide a positive connection between the shaft 90 and the valve, and for this purpose a pin 112 passing through the valve part 48 and the end of the shaft 90 may be employed as illustrated in Fig. 6.

The form of the seal around the shaft 90 may vary and an alternate is shown in Fig. 7, wherein a rubber ring 120 encircles the shaft 90 and at its opposite ends is encompassed in retainer rings 122 of substantially channel shape in cross-section. The cup-shaped member 96 screw-threaded on the sleeve 88 serves to transversely squeeze the member 120 in a direction parallel to the axis of the shaft 90 so as to thicken the same in a radial direction and thereby effect a positive seal between the skirt portion of the cup-shaped member 96 and the shaft 90.

While the preferred embodiments of the invention have been illustrated and described, it will be understood that changes in construction may be made within the scope of the appended claims without departing from the spirit of the invention.

I claim:

1. A plug valve saddle comprising a tube adapted for connection of a branch tube to one end thereof, a saddle plate integral with one end of said tube, the bore of said tube being substantially uniform throughout and open at the central part of said plate, an internally screw-threaded branch tube projecting from said first tube adjacent said plate and having a larger diameter than the bore of said first tube, a dome projecting from said first tube diametrically opposite said branch tube, said first tube having a conical valve seat transverse thereof and coaxial with said branch pipe and dome and including opposed openings in said tube, a valve plug having a screw-threaded portion rotatably adjustable in said branch tube and a conical portion adapted in one position to seat in said tube openings and engage said valve seat to span and seal the bore of said first tube, said valve plug being retractible in said branch tube clear of the bore of said first tube, said valve plug being formed of a rigid synthetic resin of the class including nylon and polyethylene with its screw-threaded portion of a diameter slightly larger than the diameter of the screw-threaded bore of said branch tube into which it is threaded to insure a sealing engagement between said plug and said branch tube and with the large end of the conical part of said plug of a diameter greater than the largest diameter of said valve seat.

2. A valve comprising a tube, an internally screw-threaded branch tube projecting from an intermediate portion of said first tube, a dome projecting from said first tube diametrically opposite said branch tube, said first tube having a conical valve seat transverse thereof and coaxial with said branch tube and dome and including opposed openings in said tube, and a valve plug having a screw-threaded portion rotatably adjustable in said branch tube and a conical portion adapted in one position to seat in said tube opening and engage said valve seat to span and seal the bore of said first tube, said valve plug being retractible in said branch tube clear of the bore of said first tube, said valve plug being formed of a synthetic resin of the class including nylon and polyethylene, the screw-threaded portion of said plug being of a diameter slightly larger than the diameter of the branch tube bore in which it is threaded, and the large end of the conical portion of said plug having a diameter greater than the largest diameter of said valve seat.

3. A valve as defined in claim 2, wherein said valve plug has an axial bore extending substantially full length of the conical portion thereof and open at its small diameter end.

4. A valve as defined in claim 2, wherein said threaded valve plug portion has a non-circular tool-receiving socket therein, and the tapered end of said valve plug has an axial socket separated from said tool socket by an integral transverse wall and of a length substantially equal to the axial dimension of said valve seat.

References Cited in the file of this patent

UNITED STATES PATENTS

| | | |
|---|---|---|
| 202,785 | Brown | Apr. 23, 1878 |
| 485,717 | Smith | Nov. 8, 1892 |
| 660,526 | Burritt | Oct. 23, 1900 |
| 1,004,845 | Bohme | Oct. 3, 1911 |
| 1,845,002 | Otton | Feb. 16, 1932 |
| 2,044,912 | Miller | June 23, 1936 |
| 2,609,955 | Moore | Sept. 9, 1952 |
| 2,790,652 | Risley et al. | Apr. 30, 1957 |

FOREIGN PATENTS

| | | |
|---|---|---|
| 5,526 | Great Britain | of 1913 |
| 20,158 | Great Britain | of 1911 |
| 153,836 | Great Britain | Nov. 18, 1920 |
| 1,078,216 | France | Nov. 16, 1954 |